US009467892B2

(12) United States Patent
Quan et al.

(10) Patent No.: US 9,467,892 B2
(45) Date of Patent: Oct. 11, 2016

(54) METHOD AND APPARATUS FOR TRANSMITTING DATA PACKET

(71) Applicant: Huawei Technologies Co., Ltd., Shenzhen, Guangdong (CN)

(72) Inventors: Wei Quan, Shenzhen (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 79 days.

(21) Appl. No.: 14/615,370

(22) Filed: Feb. 5, 2015

(65) Prior Publication Data

US 2015/0156669 A1 Jun. 4, 2015

Related U.S. Application Data

(63) Continuation of application No. PCT/CN2012/080317, filed on Aug. 17, 2012.

(51) Int. Cl.
| | |
|---|---|
| *G01R 31/08* | (2006.01) |
| *G06F 11/00* | (2006.01) |
| *H04W 4/00* | (2009.01) |
| *H04W 28/04* | (2009.01) |
| *H04L 1/18* | (2006.01) |
| *H04L 29/08* | (2006.01) |
| *H04W 28/06* | (2009.01) |

(52) U.S. Cl.
CPC ............ *H04W 28/04* (2013.01); *H04L 1/1838* (2013.01); *H04L 1/1877* (2013.01); *H04L 69/321* (2013.01); *H04W 28/06* (2013.01)

(58) Field of Classification Search
CPC ...... H04W 28/04; H04W 28/06; H04L 1/18; H04L 1/1877; H04L 1/1838; H04L 29/08; H04L 69/321

USPC ............... 370/216, 310–350; 455/418–431, 455/445–466; 714/746–758, 774, 798–804, 714/819–822
See application file for complete search history.

(56) References Cited

U.S. PATENT DOCUMENTS 7,142,542 B2 * 11/2006 Pazhyannur .......... H04L 1/1854
370/394
7,571,358 B2 * 8/2009 Yi ........................ H03M 13/09
714/48

(Continued)

FOREIGN PATENT DOCUMENTS

| CN | 1406006 A | 3/2003 |
|---|---|---|
| CN | 101155014 A | 4/2008 |

(Continued)

*Primary Examiner* — Tri H Phan
(74) *Attorney, Agent, or Firm* — Leydig, Voit & Mayer, Ltd.

(57) ABSTRACT

A method and an apparatus for transmitting a data packet are provided. A user equipment UE determines that service data unit SDU delivery needs to be performed for an erroneous data packet born on a radio bearer RB of a service. If the received data packet is not received correctly after maximum retransmission times are achieved, the UE determines that a received data packet is the erroneous data packet. The UE delivers the SDU in the erroneous data packet to a radio link control RLC entity corresponding to the RB, and the RLC entity in the UE sends the SDU to an upper layer of the RLC entity. The delivery of the erroneous data packet may be achieved, so that an air interface resource may be effectively utilized and the decoding quality may be improved.

20 Claims, 7 Drawing Sheets

(56) References Cited

U.S. PATENT DOCUMENTS

| | | | |
|---|---|---|---|
| 2003/0007480 A1* | 1/2003 | Kim | H04L 1/1812 370/349 |
| 2003/0091068 A1 | 5/2003 | Pazhyannur et al. | |
| 2007/0104109 A1* | 5/2007 | Jiang | H04L 69/40 370/244 |
| 2008/0130619 A1* | 6/2008 | Cha | H04L 1/1685 370/346 |
| 2010/0027413 A1* | 2/2010 | Park | H04L 1/1829 370/216 |
| 2012/0224525 A1* | 9/2012 | Wang | H04W 80/02 370/315 |
| 2013/0242716 A1* | 9/2013 | Amerga | H04W 76/027 370/216 |

FOREIGN PATENT DOCUMENTS

| | | |
|---|---|---|
| CN | 101227483 A | 7/2008 |
| CN | 101895372 A | 11/2010 |
| EP | 1337065 A1 | 8/2003 |
| WO | WO 2004088879 A1 | 10/2004 |

* cited by examiner

METHOD AND APPARATUS FOR TRANSMITTING DATA PACKET

CROSS-REFERENCE TO RELATED APPLICATIONS

This application is a continuation of International Patent Application No. PCT/CN2012/080317, filed on Aug. 17, 2012, which is hereby incorporated by reference in its entirety.

TECHNICAL FIELD

The present invention relates to the field of wireless communications, and particularly, to a method and an apparatus for transmitting a data packet.

BACKGROUND

In a current long term evolution (LTE) system, a media access control (MAC) layer is responsible for multiplexing multiple different RLC protocol data packet units (PDU) (RLC PDUs) of a radio link control (RLC) layer into an MAC layer PDU (MAC PDU), and then transmits on an air interface, wherein one RLC entity corresponds to one logical channel, and the RLC PDU is also called an MAC service data unit (SDU). The RLC PDU of different logical channels is expressed by a logical channel identification (LCID) in an MAC PDU header. Only after receiving the MAC PDU correctly, the MAC layer of a receiving end may deliver the MAC SDU of the different logical channels to RLC layer entities corresponding to the logical channels according to the LCID in the MAC PDU header. If the MAC layer does not receive the MAC PDU correctly, a sending end is firstly required to perform hybrid automatic repeat request (HARQ) retransmission in general until the MAC PDU is successfully received, or the MAC PDU is discarded after reaching a certain number of retransmissions.

Besides the above-mentioned operations of the MAC layer, the RLC layer also performs retransmission or not according to different transmission modes. That is, if the RLC layer is in an acknowledgement mode (AM), when the MAC layer still unsuccessfully receives the MAC PDU by means of the HARQ retransmission, automatic repeat request (ARQ) retransmission may be performed on the MAC SDU (i.e., RLC PDU) contained in the unsuccessfully received MAC PDU at the RLC layer. After successfully receiving the RLC PDU, the RLC layer of the receiving end recombines the RLC PDU into an RLC SDU and sequentially delivers the RLC SDU to an upper protocol stack of the RLC layer in a lossless manner, the upper protocol stack of the RLC layer may be a packet data convergence protocol (PDCP) layer, at this time, the RLC SDU is also called a PDCP PDU, in addition, the upper protocol stack of the RLC layer may also be radio resource control (RRC) or the like. If the RLC layer still fails to successfully receive the RLC PDU after a maximum retransmission limit, the link is considered to have a problem, and link failure information will be reported to a radio resource control (RRC) layer, in order to trigger RRC connection reestablishment. An RLC layer in an unacknowledgement mode (UM) only depends on the HARQ retransmission of the MAC layer, the RLC layer itself does not perform retransmission, so after the MAC layer discards the MAC PDU, the MAC SDU (i.e., RLC PDU) contained in the discarded MAC PDU could not be recombined into the RLC SDU (i.e., PDCP PDU), at this time, the RLC layer may only guarantee to sequentially deliver the RLC SDU (i.e., PDCP PDU) to the upper layer protocol stack and could not guarantee non-loss. In addition, the RLC layer will segment or cascade the RLC SDU (i.e., high level PDU, such as PDCP PDU) according to the sizes of low level (e.g., the MAC layer) resources, in order to be adapted to the low level resources.

However, a problem that an air interface resource is wasted exists in the prior art.

SUMMARY

The present invention provides a method and an apparatus for transmitting a data packet, for solving the problem in the prior art that an air interface resource is wasted.

In a first aspect, a method for transmitting a data packet is provided, including:
  determining, by a user equipment (UE), that service data unit (SDU) delivery needs to be performed for an erroneous data packet born on a radio bearer (RB) of a service;
  determining, by the UE, that a received data packet is the erroneous data packet, if the received data packet is not received correctly after maximum retransmission times are achieved; and
  delivering, by the UE, the SDU in the erroneous data packet to a radio link control (RLC) entity corresponding to the RB, and sending, by the RLC entity in the UE, the SDU to an upper layer of the RLC entity.

In a second aspect, a method for transmitting a data packet is provided, including:
  determining, by a base station, that service data unit (SDU) delivery needs to be performed for an erroneous data packet born on a radio bearer (RB) of a service;
  determining, by a UE, that the received data packet is the erroneous data packet, if the data packet sent by the user equipment (UE) is not received correctly after maximum retransmission times are achieved; and
  delivering, by the base station, the SDU in the erroneous data packet to a radio link control (RLC) entity corresponding to the RB, and sending, by the RLC entity in the base station, the SDU to an upper layer of the RLC entity.

In a third aspect, a user equipment (UE) is provided, including:
  a receiving module, configured to receive a data packet sent by a base station through a radio bearer (RB);
  a determining module, configured to determine that service data unit (SDU) delivery needs to be performed for an erroneous data packet born on the RB of a service; if determining that the data packet received by the receiving module is not received correctly after maximum retransmission times are achieved, determine that the data packet received by the receiving module is the erroneous data packet, and deliver the SDU in the erroneous data packet to a radio link control (RLC) entity module corresponding to the RB;
  the RLC entity module, configured to deliver the SDU delivered by the determining module to an upper layer module of the RLC entity module; and
  the upper layer module, configured to acquire the SDU delivered by the RLC entity module.

In a fourth aspect, a base station is provided, including:
  a receiving module, configured to receive a data packet sent by a user equipment (UE) through a radio bearer (RB);
  a determining module, configured to determine that service data unit (SDU) delivery needs to be performed for an erroneous data packet born on the RB of a service; if the data packet received by the receiving module is not received correctly after maximum retransmission times are achieved, determine that the data packet received by the receiving module is the erroneous data packet, and deliver the SDU in the erroneous data packet to a radio link control (RLC) entity module corresponding to the RB;

the RLC entity module, configured to deliver the SDU delivered by the determining module to an upper layer module of the RLC entity module; and the upper layer module, configured to acquire the SDU delivered by the RLC entity module.

In a fifth aspect, a user equipment (UE) is provided, including:

a receiver, configured to receive a data packet sent by a base station through a radio bearer (RB); and a processor, configured to determine that service data unit (SDU) delivery needs to be performed for an erroneous data packet born on the RB of a service; if determining that the data packet received by the receiver is not received correctly after maximum retransmission times are achieved, determine that the data packet received by the receiver is the erroneous data packet, acquire the SDU in the erroneous data packet, adopt the SDU in the erroneous data packet to constitute an RLC SDU of a radio link control (RLC) layer corresponding to the RB, and adopt the RLC SDU to form a data frame.

In a sixth aspect, a base station is provided, including:

a receiver, configured to receive a data packet sent by a user equipment (UE) through a radio bearer (RB); and a processor, configured to determine that service data unit (SDU) delivery needs to be performed for an erroneous data packet born on the RB of a service; if the data packet received by the receiver is not received correctly after maximum retransmission times are achieved, determine that the data packet received by the receiver is the erroneous data packet, acquire the SDU in the erroneous data packet, adopt the SDU in the erroneous data packet to constitute an RLC SDU of a radio link control (RLC) layer corresponding to the RB, and adopt the RLC SDU to form a data frame.

By means of the above-mentioned solution, since the SDU in the erroneous data packet is delivered to the radio link control RLC entity corresponding to the RB after determining that SDU delivery needs to be performed for the erroneous data packet born on the RB of the service, the delivery of the erroneous data packet may be achieved, so that an air interface resource may be effectively utilized and the decoding quality may be improved.

BRIEF DESCRIPTION OF DRAWINGS

To illustrate technical solutions in the embodiments of the present invention more clearly, a brief introduction to the accompanying drawings which are needed in the description of the embodiments is given below. Apparently, the accompanying drawings in the description below are merely some of the embodiments of the present invention, based on which other drawings may be obtained by those of ordinary skills in the art without any creative effort.

DESCRIPTION OF EMBODIMENTS

A clear description of technical solutions in the embodiments of the present invention will be given below, in combination with the accompanying drawings in the embodiments of the present invention. Apparently, the embodiments described below are merely a part, but not all, of the embodiments of the present invention. All of other embodiments, obtained by those of ordinary skills in the art based on the embodiments of the present invention without any creative effort, fall into the protection scope of the present invention.

For multiple current audio and video information source coding and decoding, certain correlation generally exists between two front and back data frames, at this time, a possibility will be brought that even if a data frame has an error in a transmission process, the erroneous data frame is delivered to a decoder, to still improve the decoding performance in a certain extent. Therefore, for such services, just discarding the incorrectly received MAC PDU is not the optimal processing method. On the one hand, whether the received MAC PDU is correct or not and whether the MAC SDU in the received MAC PDU is delivered to the decoder or not, the MAC PDU occupies an air interface resource; on the other hand, if the MAC SDU in the received MAC PDU is not delivered to the decoder, the air interface resource is just wasted and generates no gain for decoding.

In addition, in the existing processing method of the MAC layer, if the MAC PDU has an error, as the MAC layer could not correctly analyze the MAC PDU and could not know which part of the MAC PDU has an error, for example, the MAC layer could not determine a packet or an MAC PDU header has an error, so that the MAC layer could not determine the MAC SDU (i.e., RLC PDU) of which logical channel or which logical channels is contained in the MAC PDU through the LCID in the MAC PDU header, as a result, the MAC layer does not deliver the MAC SDU (i.e., RLC PDU) to the corresponding RLC entity.

In order to solve the above-mentioned problems, multiple embodiments are provided in the embodiment of the present invention. It should be noted that, in the case of no collision, the embodiments of the present invention and characteristics in the embodiment may be mutually combined randomly.

Figure 1:
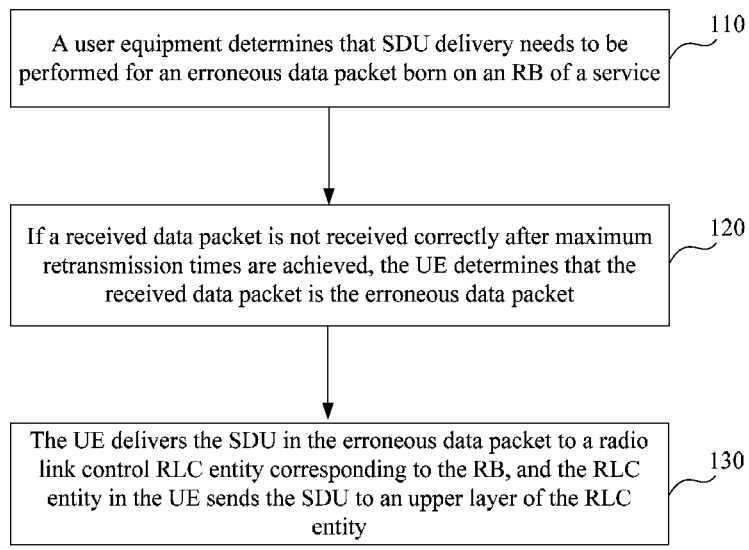
FIG. 1 is a schematic diagram of a method for transmitting a data packet of an embodiment of the present invention.

As shown in FIG. 1, a method for transmitting a data packet of an embodiment of the present invention includes the following steps:

step 110, a user equipment (UE) determines that SDU delivery needs to be performed for an erroneous data packet born on an RB of a service;

step 120, if a received data packet is not received correctly after maximum retransmission times are achieved, the UE determines that the received data packet is the erroneous data packet; and step 130, the UE delivers the SDU in the erroneous data packet to a radio link control (RLC) entity corresponding to the RB, and the RLC entity in the UE sends the SDU to an upper layer of the RLC entity.

By adopting the method in the embodiment of the present invention, since the SDU in the erroneous data packet is delivered to the radio link control (RLC) entity corresponding to the RB after determining that the SDU delivery needs to be performed for the erroneous data packet born on the RB of the service, delivery of the erroneous data packet may be realized, so that the air interface resource may be effectively utilized and the decoding quality may be improved.

Figure 2:
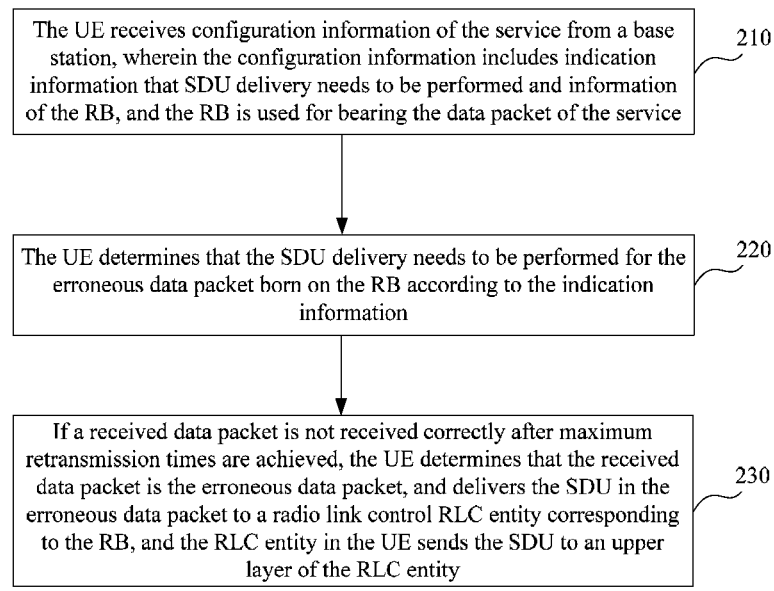
FIG. 2 is a schematic diagram of a method for transmitting a data packet of another embodiment of the present invention.

As shown in FIG. 2, a method for transmitting a data packet of another embodiment of the present invention includes the following steps:

Step 210, the UE receives configuration information of the service from a base station, wherein the configuration information includes indication information that delivery of the erroneous data packet needs to be performed and information of the RB, and the RB is used for bearing the data packet of the service.

In this step, the indication information is one-to-one correspondent to the RB of the service. The indication may be achieved in multiple manners For example, the indication may be a dedicated-radio network temporary identifier (D-RNTI) configured by the base station for the UE, wherein the D-RNTI may be not only used for indicating that the delivery of the erroneous data packet needs to be performed, but also be used for notifying the UE of such information as a time domain and frequency domain resource and a modulation coding manner adopted when sending or receiving the data packet of the service by means of a masked scheduling command, for enabling the UE to receive and send the data packet on the time domain and frequency domain resource notified by the masked scheduling command in the modulation coding manner.

Or, the indication information may be a position of an indication bit in the scheduling command. In this case, the determining, by the UE, that the SDU delivery needs to be performed for the erroneous data packet born on the RB according to the indication information, includes: determining, by the UE, the position of the indication bit in the scheduling command according to the indication information, and determining that the SDU delivery needs to be performed for the erroneous data packet born on the RB according to the indication bit in the scheduling command. At this time, the scheduling command may be masked by a cell-radio network temporary identifier (C-RNTI) configured by the base station for the UE.

In addition, the indication information may also be realized in other manners, for example, may be the D-RNTI and the position of the indication bit in the scheduling command Since one RB is established for one service at an air interface, the RB is one-to-one correspondent to one logical channel, and one RB corresponds to one RLC entity, therefore, by sending the indication that the SDU delivery needs to be performed for the data packet of the service and information of the RB corresponding to the indication to the UE, the UE may acquire the RLC entity corresponding to the data packet needed to be performed with the SDU delivery, so that the SDU may be delivered to the corresponding RLC entity.

It should be noted that, the service may be one or multiple services, when the SDU delivery needs to be performed for multiple services, one D-RNTI may be configured to each service, or an indication bit is added for each service in the scheduling command masked by the C-RNTI. In the embodiment of the present invention, one service is taken as an example for illustration, and the implementation manner of multiple services is the same as that of one service. In the case of multiple services, the indication that the SDU delivery needs to be performed for the data packet of the service of the multiple services and the information of the corresponding RB may be sent together, and may also be respectively sent aiming at the services.

Step 220, the UE determines that the SDU delivery needs to be performed for the erroneous data packet born on the RB according to the indication information.

Step 230, if a received data packet is not received correctly after maximum retransmission times are achieved, the UE determines that the received data packet is the erroneous data packet, and delivers the SDU in the erroneous data packet to a radio link control (RLC) entity corresponding to the RB, and the RLC entity in the UE sends the SDU to an upper layer of the RLC entity.

By adopting the method in the embodiment of the present invention, SDU delivery may be achieved, so that an air interface resource may be effectively utilized and the decoding quality may be improved.

Figure 3:
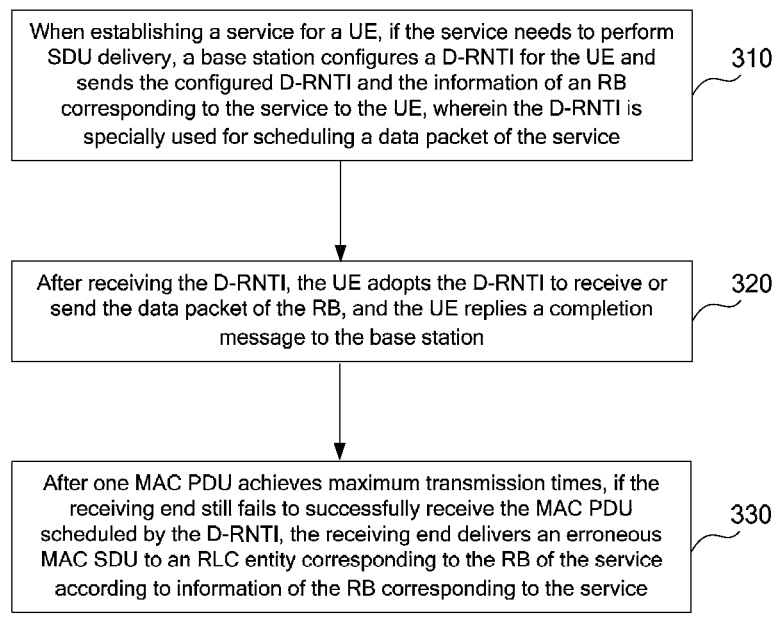
FIG. 3 is a schematic diagram of a method for transmitting a data packet of another embodiment of the present invention.

As shown in FIG. 3, another embodiment of the present invention includes the following steps:

Step 310, when establishing a service for a UE, if the service needs to perform delivery of erroneous data packet, a base station configures a D-RNTI for the UE and sends the configured D-RNTI and the information of an RB corresponding to the service to the UE, wherein the D-RNTI is specially used for scheduling a data packet of the service.

In this step, the base station may determine that the service needs to perform the SDU delivery according to the service type or user subscription information and the like.

Of course, the embodiment of the present invention is not limited to that the D-RNTI and the information of the RB corresponding to the service are sent when establishing the service for the UE, and may also be sent after the service is established.

Optionally, the base station may also configure maximum HARQ transmission times for a MAC PDU of the service. At this time, the maximum HARQ transmission times may be specially configured to the data packet of the RB, and may also be maximum HARQ transmission times shared by the data packet of the RB and the data packet of other one or multiple RB.

Optionally, an error indication parameter may also be configured to the data packet (e.g., MAC SDU and/or RLC SDU) of the RB, when being used for indicating to deliver erroneous SDU to an upper layer at a certain layer, the error indication parameter is used for indicating that the SDU is an erroneous SDU at the same time, for example, when delivering the erroneous SDU to an RLC layer, an MAC layer simultaneously indicates the RLC layer that the SDU is an erroneous SDU; as another example, when delivering the erroneous SDU to a PDCP layer, the RLC layer simultaneously indicates the PDCP layer that the SDU is an erroneous SDU.

In this step, the base station may send the D-RNTI to the UE through an RRC message, for example, an RRC connection reconfiguration message, and may also send the D-RNTI to the UE through MAC layer signaling or physical layer signaling. In addition, when the base station is further configured with the maximum HARQ transmission times and/or the error indication parameter, the maximum HARQ transmission times and/or the error indication parameter may also be sent to the UE together with the D-RNTI through the RRC message or the MAC layer signaling or the physical layer signaling. Of course, the maximum HARQ transmission times and/or the error indication parameter may also be singly sent to the UE.

After the base station sends the D-RNTI to the UE or receives a completion message sent by the UE, if a data packet of the RB of the UE needs to be scheduled, the base station adopts the D-RNTI to schedule the data packet of the RB.

Wherein the adopting the D-RNTI to schedule the data packet of the RB refers to using such parameters as a time domain and frequency domain resource and a modulation coding manner or the like adopted when notifying the UE to send or receive the data packet through a scheduling command masked by the D-RNTI, and sending or receiving the data packet on the notified time domain and frequency domain resource in the notified modulation coding manner; correspondingly, the UE receives or sends the data packet on the time domain and frequency domain resource notified by the scheduling command in the notified modulation coding manner, wherein the scheduling command is transmitted to the UE on a physical downlink control channel (PDCCH).

Step 320, after receiving the D-RNTI, the UE adopts the D-RNTI to receive or send the data packet of the RB, and the UE replies a completion message to the base station.

The adopting, by the UE, the D-RNTI to receive the data packet of the RB, includes: adopting, by the UE, such parameters as a time domain and frequency domain resource and a modulation coding manner or the like adopted by the UE when receiving the data packet and notified by the base station by means of the scheduling command masked by the D-RNTI, in order to receive the data packet on the notified time domain and frequency domain resource in the notified modulation coding manner; or the adopting, by the UE, the D-RNTI to send the data packet of the RB, includes: adopting, by the UE, such parameters as the time domain and frequency domain resource and the modulation coding manner or the like adopted by the UE when sending the data packet and notified by the base station by means of the scheduling command masked by the D-RNTI, in order to send the data packet on the notified time domain and frequency domain resource in the notified modulation coding manner.

When the UE can adopt the D-RNTI to receive or send the data packet of the RB, the UE replies the completion message to the base station.

After the base station sends the configured D-RNTI to the UE, the base station and the UE may both send or receive the data packet. A receiving end and a sending end are used for describing hereinafter. It should be noted that, in the following paper, if the receiving end is the base station, the sending end is the UE, and if the receiving end is the UE, the sending end is the base station.

In this step, for example, the completion message may be an RRC connection reconfiguration completion message or other signaling.

In the embodiment, the RLC layer and the MAC layer of the sending end do not segment or cascade their respective upper layer data packets (for example, the upper layer data packet of the RLC layer may be a PDCP PDU, and the upper layer data packet of the MAC layer may be an RLC PDU), so that no RLC or MAC header is added, and only the data packet (for example, a PDCP PDU) transmitted from the upper layer is sent to a physical layer and is transmitted at an air interface. That is, MAC PDU, MAC SDU, RLC PDU, RLC SDU and PDCP PDU are completely the same actually. In this application, the upper layer of the RLC layer refers to a protocol layer above the RLC layer in a protocol stack, for example, RRC or PDCP or the like. The upper layer of the MAC includes the RLC layer and the upper layer of the RLC layer.

Since no segmentation or cascade is performed in the embodiment, namely, the RLC layer and the MAC layer of the sending end do not segment or cascade the data packet (for example, a PDCP PDU) of the upper layer, when scheduling the data packet, the base station needs to select a proper scheduling resource size and a modulation coding manner according to the size of the data packet to be scheduled.

Figure 3A:
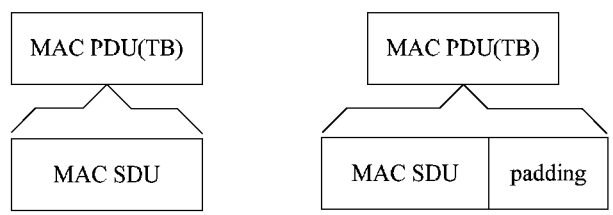
FIG. 3a is a schematic diagram of formats of unpadded and padded MAC PDU of an embodiment of the present invention.

Optionally, the scheduling command may further include a padding indication of one or multiple bits, and the padding indication is used for indicating the number of padding in the scheduled MAC PDU; the receiving end may determine the size of an actual data packet according to the padding indication, in order to separate the actual data packet and deliver the same to the upper layer. Wherein, the formats of the unpadded and padded MAC PDU are as shown in FIG. 3a respectively.

Step 330, after one MAC PDU achieves maximum transmission times, if the receiving end still fails to successfully receive the MAC PDU scheduled by the D-RNTI, the receiving end delivers an erroneous MAC SDU to an RLC entity corresponding to the RB of the service according to information of the RB corresponding to the service.

If successfully decoding to acquire the MAC PDU scheduled by the D-RNTI, the MAC layer of the receiving end delivers the MAC SDU in the MAC PDU to the corresponding RLC entity, and feeds back an acknowledgement (ACK) message to the sending end.

If not successfully receiving the MAC PDU scheduled by the D-RNTI, the MAC layer of the receiving end feeds back a negative acknowledgement (NACK) message to the sending end, to request the sending end to retransmit the MAC PDU until the receiving end successfully receives the MAC PDU; the MAC layer of the receiving end delivers the MAC SDU in the MAC PDU to the corresponding RLC entity, or the sending end achieves the maximum transmission times, the sending end does not retransmit the MAC PDU any more, the receiving end still delivers the unsuccessfully received MAC SDU to the RLC entity corresponding to the RLC layer, and then the RLC entity of the receiving end delivers the error MAC SDU to the upper layer of the RLC layer.

In addition, if an error indication parameter is further configured, when delivering the erroneous SDU to the corresponding RLC entity, the MAC layer simultaneously indicates the RLC entity that the SDU is erroneous.

When receiving the MAC SDU delivered by the MAC layer, the RLC entity adopts the MAC SDU to constitute an upper layer SDU and delivers the constituted upper layer SDU to the upper layer of the RLC entity; if the MAC SDU is erroneous and the error indication parameter is configured, the RLC entity indicates the upper layer that the RLC SDU is erroneous at the same time.

By adopting the method in the embodiment of the present invention, SDU delivery may be achieved, so that an air interface resource may be effectively utilized and the decoding quality may be improved.

In another implementation manner of the present invention, the UE may also indicate the UE that SDU delivery needs to be performed in other manners. In the embodiment, the configuration of the adopting the D-RNTI in the former embodiment is modified to still use a cell-radio network temporary identifier (C-RNTI) adopted in the prior art, and the difference lies in that, in the embodiment, indication information and an indication bit added in a scheduling command masked by the C-RNTI are used for indicating the UE that the SDU delivery needs to be performed for a data packet of an RB corresponding to the indication bit. For example, one indication bit is added in the scheduling command masked by the C-RNTI and transmitted on the PDCCH, when the position of the indication bit is 1, it indicates that the data packet of the RB scheduled by the scheduling command is a data packet of the RB which needs to perform the SDU delivery; in the case of 0, it indicates that the data packet scheduled by the scheduling command is a common data packet which does not need to perform the SDU delivery, and segmented serial multiplexing operation is the same as that in the prior art. In this case, in step 210, the indication included in the indication information is a position of the indication bit in the scheduling command. In this case, in one scheduling command masked by the C-RNTI, only one indication bit corresponding to the RB indicates that the SDU delivery needs to be performed, for enabling an MAC layer to deliver the SDU to a corresponding RLC entity.

Specifically, an existing idle indication bit in the scheduling command masked by the C-RNTI and transmitted on the PDCCH may be used as the indication bit, and a new scheduling command format masked by the C-RNTI and transmitted on the PDCCH may also be designed.

Other operations are the same as those in the above-mentioned embodiment, and will not be repeated redundantly herein.

By receiving an indication that the SDU delivery needs to be performed for a data packet of a service and information of the RB corresponding to the indication, the UE may acquire the RB corresponding to the service needed to perform the SDU delivery, so that the SDU may be delivered to the corresponding RLC entity, the air interface resource may be effectively utilized and the decoding quality may be improved.

In the above-mentioned embodiment, no segmentation or cascade is performed. Although the SDU delivery is realized, when the size of the data packet is not matched with the resource, padding may be caused, namely, the air interface resource may be wasted. Another embodiment of the present invention is an expansion of the above-mentioned embodiment, and is used for performing the SDU delivery when tandem connection and/or cascade are/is needed. In the embodiment, prior to step 330, the method further includes the following steps:

Step 410, the UE receives an SDU size sent by a base station.

If the base station is about to send data to the UE, the base station notifies the UE of the SDU size, and the SDU size is used for indicating the size of each SDU in the erroneous data packet. After receiving the data packet, the UE acquires each SDU in the data packet according to the SDU size. In this way, for the erroneous SDU, each SDU in the data packet may be acquired without acquiring the size of each SDU according to LCID in the data packet.

If the UE is about to send data to the base station, the base station will acquire the size of the data to be sent by the UE in advance, and send the SDU size to the UE, for enabling the UE to generate the data packet according to the SDU size.

Step 420, according to the size of the SDU sent by the base station, an RLC entity corresponding to the RB in the UE segments and/or cascades the SDU to be sent and sends the segmented and/or cascaded data packet to the base station. In this case, the RLC entity in the base station recombines the received data packet according to the size of the SDU sent by the base station. Or, according to the size of the data sent by the base station, the RLC entity corresponding to the RB segments and/or cascades the SDU to be sent and sends the segmented and/or cascaded data packet to the UE; in this case, the RLC entity of the UE recombines the received data packet according to the size of the SDU received from the base station. Of course, the segmentation and/or cascade may be performed by physical layers in the base station and the UE, and correspondingly, the recombination may also be performed by the physical layers in the base station and the UE.

It should be noted that, in this step, when an erroneous SDU needs to be delivered, the erroneous SDU is recombined with a correct SDU according to the size of the SDU contained in the data packet of the RB to be sent by the base station.

By notifying the size of the SDU contained in the data packet of the RB sent by a sending end to a receiving end, the receiving end may know the size of the received SDU and acquire the number of the received SDU according to the size of the notified SDU, so as to correctly process the received data packet, wherein the size of the SDU contained in the data packet of the RB sent by the sending end is the size of the PDU of a high layer of the RB, for example, the size of an IP data packet. The receiving end acquires the number of the IP data packets according to the size of the notified IP data packets, so as to correctly recombine the received data packet into the IP data packet and deliver to an IP layer. Of course, when notifying the size of the SDU contained in the data packet of the RB sent by the sending end, the sending end may also directly notify the number of the SDU.

Figure 4:
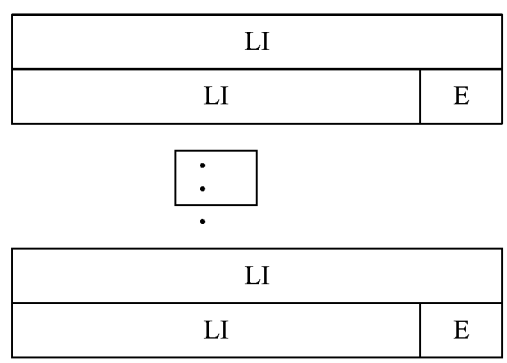
FIG. 4 is a simple example of signaling used for notifying a UE of a size of an SDU contained in a data packet of an RB of an embodiment of the present invention.

The signaling used for notifying the receiving end of the size of the SDU contained in the data packet of the RB sent by the sending end may be an RRC message, or the size of the notified SDU is born on a PDCP control packet, an RLC control packet and even an MAC control elements (CE). The signaling at least sequentially includes the size of each SDU contained in the data packet of the RB. For example, FIG. 4 is a simple example of the signaling used for notifying the UE of the size of the SDU contained in the data packet of the RB, in FIG. 4, a length indicator (LI) indicates the size of the corresponding SDU, and E represents whether an LI domain exists behind; of course, the signaling may also be used for beginning to indicate the number of the LI domains, and the LI of each SDU is located behind in sequence.

If the signaling used for notifying the receiving end of the size of the SDU contained in the data packet of the RB sent by the sending end is the RRC message, the signaling is transmitted on a signaling radio bearer (SRB); if the signaling is a PDCP/RLC layer control packet, the signaling is transmitted on the SRB, a dedicated data radio bearer (DRB) may also be allocated to the signaling, and the signaling may also be transmitted on the RB.

Figure 5:
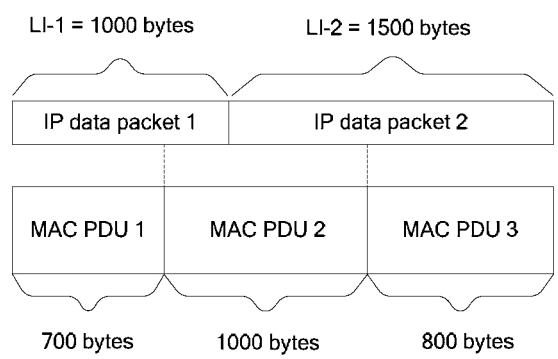
FIG. 5 is a schematic diagram of an assembled packet format of a sending end of an embodiment of the present invention.

Before sending the data packet, the RLC entity corresponding to the RB of the sending end segments and/or cascades the SDU (namely, high level SDU, for example, the IP data packet) to be sent by the sending end according to the size of a scheduling resource, to be adapted to the size of the resource. It should be noted that, a data packet transmitted at a certain layer to the upper layer is called an SDU and a data packet transmitted by a certain layer to the low layer is called a PDU, thus in the embodiment, an object segmented and cascaded by the sending end is the PDU, and an object recombined by the receiving end is the SDU. Wherein, segmentation and cascade may be performed simultaneously, or only one is performed, for example, the RLC entity of the sending end cascades the PDUs of two high layers to the PDU of a low layer, or segments the PDU of the high layer to the PDUs of the two low layers, or cascades a part of the PDU of the first high layer and the PDU of the second high layer to the PDU of the low layer; an assembled format of a packet at the sending end may be as shown in FIG. 5. In FIG. 5, the size of the SDU contained in the data packet of the RB sent by the sending end carried in the above-mentioned MAC PDU is indicated by the LI domain in the above-mentioned signaling, and the receiving end may recombine and deliver the data packet according to the signaling. For example, if the sending end needs to send two IP data packets with respective sizes of 1000 bytes and 1500 bytes, then the sending end firstly notifies the receiving end of the sizes of the two IP data packets through signaling, and then sends the two IP data packets to the receiving end by dividing the same into three MAC PDUs (which are respectively MAC PDU 1, MAC PDU 2 and MAC PDU 3); after receiving the signaling, the receiving end knows that two IP data packets with respective sizes of 1000 bytes and 1500 bytes need to be received, when receiving the MAC PDU 1, since the MAC PDU 1 only has 700 bytes, which is smaller than the 1000 bytes of the first IP data packet, so that the MAC PDU 1 will not be recombined; when receiving the MAC PDU 2, the receiving end recombines the former 300 bytes in the MAC PDU 1 and the MAC PDU 2 into the first IP data packet, and delivers the first IP data packet to the high layer; when receiving the MAC PDU 3, the receiving end recombines the latter 700 bytes in the MAC PDU 2 and the MAC PDU 3 into the second IP data packet, and delivers the second IP data packet to the high layer.

In the embodiment of the present invention, since the size of the SDU contained in the data packet of the RB sent by the sending end is notified to the receiving end, no LCID needs to be added in the sent data packet, so that the receiving end may recombine the data packet according to the size of the SDU contained in the data packet of the RB sent by the sending end. In this way, even if the data packet is erroneous, the SDU may be acquired without reference to the LCID. Therefore, by adopting the method in the embodiment of the present invention, SDU delivery may be achieved and segmentation and/or cascade may also be achieved, so that the utilization rate of the air interface resource may be further improved when the size of the data packet is not matched with the resource.

In another embodiment of the present invention, in order to guarantee sequential upward delivery, an MAC layer needs to complete reordering of received data packets. The embodiment is an expansion of the above-mentioned embodiment. In general, the MAC layer has multiple progresses for processing the data packets, at the same moment, one progress is used for receiving and sending the data packets. Since the numbers of HARQ retransmissions performed on different data packets may be different, the correct receiving time of a receiving end may not be uniform with the sequence of sending data packets by the sending end, for example, the data packet sent by the sending end by using the progress 1 at moment n may be performed with HARQ retransmission for twice and is successfully received by the receiving end at moment n+16, the data packet sent by the progress 2 at moment n+4 is performed with the HARQ retransmission for once and is successfully received by the receiving end at moment n+12, namely, before the data packet sent by the progress 1 is successfully received, so that disorder will be generated. In the prior art, reordering is achieved by packet headers of the data packets, for example, by serial numbers (SN) in the packet headers. However, when an erroneous SDU exists, the received data packets could not be analyzed, so that the reordering could not be performed through the SN. In the embodiment, no SN number is carried.

Figure 6:
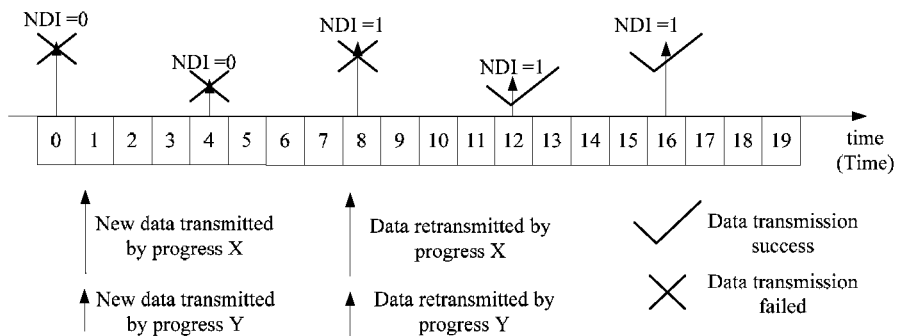
FIG. 6 is example 1 of a schematic diagram of a progress time sequence of an embodiment of the present invention.

To solve the above-mentioned disorder problem, in the embodiment, the reordering is completed at the MAC layer, and the specific method includes the following several implementation manners First implementation manner the reordering may be performed by using a new data packet indicator (NDI) domain in the scheduling command in the above-mentioned embodiment transmitted on the PDCCH. For example, for a progress, when the NDI in the scheduling command is 0, it indicates that a new data packet is transmitted, and when the NDI is 1, it indicates retransmission of the former data packet. The receiving end judges the sequence of the data packets by judging the transmission moment of the data packet with NDI of 0, in order to complete the reordering function. As shown in FIG. 6, although the data packet transmitted by the progress x at moment 0 is received by the receiving end after being transmitted at moment 16 for three times, and the data packet transmitted by the progress y at moment 4 is received at moment 12, the receiving end may judge that the data packet using the progress x is prior to the data packet using the progress y according to respective NDI indication of the progress x and the progress y, and may accurately perform the reordering as a result, wherein the receiving end may judge the progress of the received NDI according to such information as the moment of receiving the NDI and/or a progress number transmitted on the PDCCH.

Figure 7:
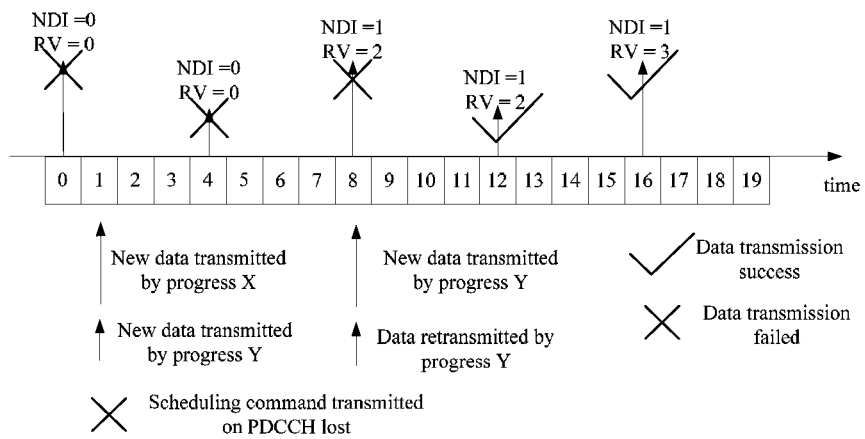
FIG. 7 is example 2 of a schematic diagram of a progress time sequence of an embodiment of the present invention.

Second implementation manner taking it into consideration that the scheduling command transmitted on the PDCCH may be lost, this implementation manner may further perform reordering by using a redundancy version (RV) domain in the scheduling command transmitted on the PDCCH. Specifically, in multiple HARQ retransmission processes, different redundancy versions may be respectively used, for example, RV=0 is used in new transmission, RV=2 is used in the first retransmission, RV=3 is used in the second retransmission, RV=1 is used in the third retransmission, RV=0 is used in the fourth retransmission, and the steps are just repeated in this manner. A fixed transmission interval is used between the new transmission and the first retransmission and between two adjacent retransmissions, namely, synchronous HARQ retransmissions are performed, for example, the interval is 8 sub-frames. In this way, even if receiving no scheduling command of new transmission, when receiving retransmission, the receiving end may judge how many times the retransmission is performed according to the redundancy version, to calculate the moment of the first transmission, so as to perform the reordering. As shown in FIG. 7, although the data packet transmitted by the progress x at moment 0 suffers scheduling command loss, it is received by the receiving end at moment 16, the receiving end judges that the data packet is with third time HARQ transmission through the RV=1 in the scheduling command, so that the receiving end may assume that the first time HARQ transmission happens at moment 0; and then, the receiving end may judge that the data packet using the progress x is prior to the data packet using the progress y, and may perform accurately reordering as a result. In addition, the receiving end may also simultaneously judge by combining the NDI with the RV, for example, when the NDI is 1, it indicates that the scheduling command is a scheduling command of retransmission, and meanwhile, the retransmission time is judged according to the used RV.

Figure 8:
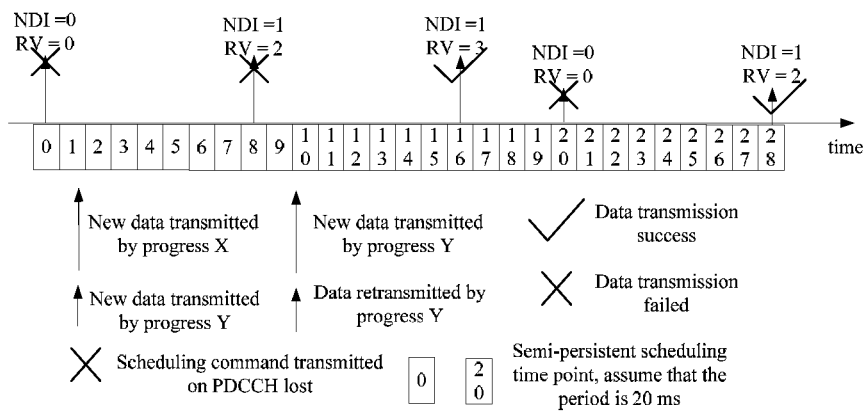
FIG. 8 is example 3 of a schematic diagram of a progress time sequence of an embodiment of the present invention.

Third implementation manner the base station and the UE may configure a semi-persistent scheduling period in advance, and the semi-persistent scheduling period may be configured by an RRC message. The base station periodically schedules a new data packet of the RB needed to be performed with SDU delivery. Specifically, the first scheduling moment may be activated by the scheduling command transmitted on PDCCH, may also be activated by MAC CE and may also be semi-persistently configured through the RRC message. Since the same progress is adopted in the retransmission and the new transmission, by using the progress adopted in the retransmission, the receiving end may judge the progress adopted in the new transmission, so as to judge the semi-persistent scheduling time point corresponding to the transmission of the new data packet by using the progress. As shown in FIG. 8, it is assumed that the semi-persistent scheduling period is 20 ms, a fixed transmission interval is used between the new transmission and the first retransmission and between two adjacent retransmissions, namely, synchronous HARQ retransmissions are performed, for example, the interval is 8 sub-frames. A data packet with progress of x and scheduled at the semi-persistent scheduling period of moment 0 is absolutely scheduled earlier than a data packet with progress of y and scheduled at the semi-persistent scheduling period of moment 20. The receiving end may acquire that the semi-persistent scheduling time point corresponding to the transmission of the new data packet by using the progress according to a retransmitted data packet received at moment 16 is the moment 0, and may acquire that the semi-persistent scheduling time point corresponding to the transmission of the new data packet by using the progress according to a retransmitted data packet received at moment 28 is the moment 20.

In addition, in the embodiment, the reordering may also be performed by using any combination of the above-mentioned multiple implementation manners, for example, as stated, the NDI may be combined with the RV for judging, or the semi-persistent scheduling period may be combined with the RV for judging, or the semi-persistent scheduling period, the NDI and the RV may be combined for judging, and the like.

By means of one or multiple manners in the above-mentioned NDI, RV domain and the semi-persistent scheduling period, the embodiment of the present invention may be used for not only achieving SDU delivery, but also reordering to avoid disorder.

Figure 9:
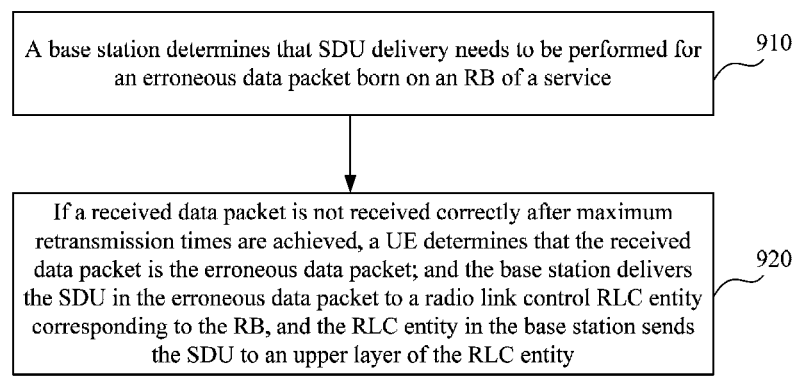
FIG. 9 is a schematic diagram of a method for transmitting a data packet of another embodiment of the present invention.

Another embodiment of the present invention provides a method for transmitting a data packet, and as shown in FIG. 9, the method includes the following steps:

step 910, a base station determines that SDU delivery needs to be performed for an erroneous data packet born on an RB of a service; and step 920, if a received data packet is not received correctly after maximum retransmission times are achieved, the base station determines that the received data packet is the erroneous data packet; and the base station delivers the SDU in the erroneous data packet to a radio link control RLC entity corresponding to the RB, and the RLC entity in the base station sends the SDU to an upper layer of the RLC entity.

By adopting the method in the embodiment of the present invention, after determining that the SDU delivery needs to be performed for the erroneous data packet born on the RB of the service, the SDU in the erroneous data packet may be delivered to the RLC entity corresponding to the RB bearing the data packet, so that the SDU delivery may be implemented.

In addition, after the determining, by a base station, that SDU delivery needs to be performed for an erroneous data packet born on an RB of a service, the method further includes:

step 930, the base station sends configuration information of the service to the UE, for enabling the UE to determine that the SDU delivery needs to be performed for the erroneous data packet born on the RB according to the configuration information, wherein the configuration information includes indication information that the SDU delivery needs to be performed for the erroneous data packet born on the RB and information of the RB, wherein the indication information may be a D-RNTI configured by the base station for the UE; or the indication may be a position of an indication bit in a scheduling command, for enabling the UE to determine the indication bit in the scheduling command according to the indication information, and to determine that the SDU delivery needs to be performed for the erroneous data packet born on the RB according to the indication bit in the scheduling command, wherein the scheduling command may be a scheduling command masked by the base station by using C-RNTI, and the indication bit is an indication bit added in the scheduling command Optionally, the configuration information may further include:

maximum hybrid automatic repeat request HARQ retransmission times configured by the base station for the data packet of the service; and/or an error indication parameter configured by the base station for the data packet of the service;

in this step, the base station may send the configuration information of performing the SDU delivery for the data packet to the RB of the service through an RRC message or MAC layer signaling or physical layer signaling.

If the configuration information further includes the error indication parameter, in the step, when the SDU in the data packet is delivered to the RLC entity corresponding to the RB, the RLC entity is indicated that the delivered SDU is an erroneous SDU at the same time; when sending the erroneous SDU to the upper layer of the RLC layer, the RLC entity indicates the upper layer of the RLC layer that the delivered SDU is the erroneous SDU at the same time.

Optionally, before delivering the SDU in the data packet to the RLC entity corresponding to the RB, the method further includes: the base station determines a padding size according to the size of data to be sent by the UE, wherein the SDU bears the data to be sent by the UE.

The delivering the SDU in the erroneous data packet to the RLC entity corresponding to the RB, includes: according to the padding size, removing padding corresponding to the padding size in the erroneous data packet to acquire the SDU in the erroneous data packet, and delivering the SDU in the erroneous data packet to the RLC entity corresponding to the RB.

In the embodiment, by sending the indication information that the SDU delivery needs to be performed for the data packet of the service and the information of the RB corresponding to the indication to the UE, the base station and the UE in the embodiment may acquire the RB of the service needed to perform the SDU delivery, so that the SDU may be delivered to the corresponding RLC entity, the air interface resource may be effectively utilized and the decoding quality may be improved.

In addition, before delivering the SDU in the data packet to the RLC entity corresponding to the RB, the method in the embodiment may further include: the base station determines the size of each SDU in the erroneous data packet according to the data to be sent by the UE;

the delivering the SDU in the erroneous data packet to an RLC entity corresponding to the RB, includes: determining each SDU according to the sizes of the SDU in the erroneous data packet, recombining the SDU into an RLC SDU, and delivering the RLC SDU to the RLC entity, wherein each SDU bears the data to be sent by the UE;

the delivering, by the RLC entity, the SDU to the upper layer of the RLC entity, includes: the RLC entity delivers the RLC SDU to the upper layer of the RLC entity.

In the embodiment of the present invention, since the size of the SDU contained in the data packet of the RB sent by the sending end is notified to the receiving end, no LCID needs to be added in the sent data packet, so that the receiving end may recombine the data packet according to the size of the SDU contained in the data packet of the RB sent by the sending end. In this way, even if the data packet is erroneous, the SDU may be acquired without reference to the LCID. Therefore, by adopting the method in the embodiment of the present invention, SDU delivery may be achieved and segmentation and/or cascade may also be achieved, so that the utilization rate of the air interface resource may be further improved when the size of the data packet is not matched with the resource.

Before delivering the SDU in the data packet to the RLC entity corresponding to the RB, the method in the embodiment may further include:
reordering the received data packet by means of one or any combination of the following manners:
judging the progress, to which the data packet belongs, by using a new data packet indication NDI domain in the scheduling command transmitted on a physical downlink control channel PDCCH, and reordering the data packet according to the progress;
determining the first transmission moment of the data packet through a redundancy version RV domain in the scheduling command transmitted on the PDCCH, and reordering the data packet according to the determined first transmission moment; and
determining the first transmission moment of the data packet according to a pre-configured semi-persistent scheduling period, and reordering the data packet according to the determined first transmission moment.

By means of one or multiple manners in the above-mentioned NDI, RV domain and the semi-persistent scheduling period, the embodiment of the present invention may be used for not only implementing SDU delivery, but also reordering to avoid disorder.

Figure 10:
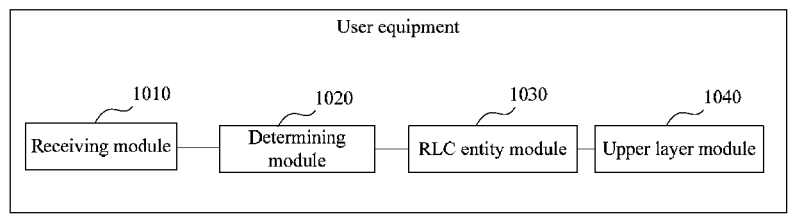
FIG. 10 is a schematic diagram of a user equipment of an embodiment of the present invention.

Another embodiment of the present invention provides UE, and the UE may perform the method for transmitting data in any above-mentioned embodiment. The embodiment only simply describes the structure of the UE, and the specific implementation manner may refer to descriptions in the above-mentioned embodiment. As shown in FIG. 10, the UE includes:
a receiving module 1010, configured to receive a data packet sent by a base station through an RB;
a determining module 1020, configured to determine that service data unit SDU delivery needs to be performed for an erroneous data packet born on the RB of a service; if determining that the data packet received by the receiving module 1010 is not received correctly after maximum retransmission times are achieved, determine that the data packet received by the receiving module is the erroneous data packet, and deliver the SDU in the erroneous data packet to a radio link control RLC entity module corresponding to the RB;
the RLC entity module 1030, configured to deliver the SDU delivered by the determining module 1020 to an upper layer module of the RLC entity module; and
the upper layer module 1040, configured to acquire the SDU delivered by the RLC entity module 1030.

Wherein, the receiving module 1010 is further configured to receive configuration information of the service from the base station, wherein the configuration information includes indication information that the SDU delivery needs to be performed and information of the RB;
the determining module 1020 is specifically configured to determine that the service data unit SDU delivery needs to be performed for the erroneous data packet born on the radio bearer RB of the service in the following manner determining that the SDU delivery needs to be performed for the erroneous data packet born on the RB according to the indication information.

Further, the receiving module 1010 is specifically configured to receive a dedicated-radio network temporary identifier D-RNTI, wherein the D-RNTI is the indication information; the determining module 1020 is specifically configured to determine that the SDU delivery needs to be performed for the erroneous data packet born on the RB according to the indication information in the following manner determining that the SDU delivery needs to be performed for the erroneous data packet born on the RB according to the D-RNTI, wherein the D-RNTI is configured by the base station for the UE.

Optionally, the receiving module 1010 is specifically configured to receive a position of an indication bit in a scheduling command, wherein the position of the indication bit in the scheduling command is the indication information;
the receiving module 1010 is further configured to receive the scheduling command sent by the base station, wherein the scheduling command includes the indication bit;
the determining module 1020 is specifically configured to determine that the SDU delivery needs to be performed for the erroneous data packet born on the RB according to the indication information in the following manner determining the indication bit in the scheduling command according to the indication information, and determining that the SDU delivery needs to be performed for the erroneous data packet born on the RB according to the indication bit in the scheduling command received by the receiving module 1010, wherein the indication information is the position of the indication bit in the scheduling command Optionally, the receiving module 1010 is specifically configured to receive the configuration information of the service from the base station in the following manner the UE receives the configuration information of the service from the base station through a radio resource control RRC message or media access control MAC layer signaling or physical layer signaling.

Optionally, the configuration information received by the receiving module 1010 may further include an error indication parameter;

the determining module 1020 is specifically configured to deliver the SDU in the erroneous data packet to the RLC entity module 1030 corresponding to the RB in the following manner delivering the SDU in the erroneous data packet to the RLC entity module 1030 corresponding to the RB, and indicating the RLC entity module 1030 that the delivered SDU is not received correctly according to the error indication parameter;

the RLC entity module 1030 is specifically configured to send the SDU to the upper layer module 1040 of the RLC entity module 1030 in the following manner the RLC entity module 1030 sends the SDU to the upper layer module 1040 of the RLC entity module 1030, and indicates the upper layer module 1040 that the delivered SDU is not received correctly.

Optionally, the receiving module 1010 is further configured to receive SDU size information sent by the base station, and the SDU size information is used for indicating the size of each SDU in the erroneous data packet.

The determining module 1020 is further configured to determine each SDU in the erroneous data packet according to the SDU size information received by the receiving module 1010, before delivering the SDU in the erroneous data packet to the RLC entity module 1030 corresponding to the RB;

the determining module 1020 is specifically configured to deliver the SDU in the erroneous data packet to the RLC entity module 1030 corresponding to the RB in the following manner recombining the SDU into an RLC SDU, and delivering the RLC SDU to the RLC entity module 1030;

the RLC entity module 1030 is specifically configured to deliver the SDU to the upper layer module 1040 of the RLC entity module 1030 in the following manner delivering the RLC SDU to the upper layer module 1040 of the RLC entity module 1030.

The receiving module 1010 is further configured to receive padding indication sent by the base station by the UE, wherein the padding indication is used for indicating the padding size of the data packet;

the determining module 1010 is further configured to determine the padding size in the erroneous data packet, before delivering the SDU in the erroneous data packet to the RLC entity module corresponding to the RB;

the determining module 1020 is specifically configured to deliver the SDU in the erroneous data packet to the RLC entity module 1030 corresponding to the RB in the following manner removing padding corresponding to the padding size in the erroneous data packet according to the padding size to acquire the SDU in the erroneous data packet, and delivering the SDU to the RLC entity module 1030 corresponding to the RB.

Optionally, the determining module 1020 is further configured to reorder the erroneous data packet in one or any combination of the following manners, before delivering the SDU in the erroneous data packet to the RLC entity module 1030 corresponding to the RB:

judging a progress, to which the erroneous data packet belongs, by using a new data packet indication NDI domain in a scheduling command transmitted on a physical downlink control channel PDCCH, and reordering the erroneous data packet according to the progress;

determining the first transmission moment of the erroneous data packet by using a redundancy version RV domain in the scheduling command transmitted on the PDCCH, and reordering according to the first transmission moment; and determining the first transmission moment of the erroneous data packet according to a preset semi-persistent scheduling period, and reordering according to the first transmission moment;

the determining module 1020 is specifically configured to deliver the SDU in the erroneous data packet to the RLC entity module 1030 corresponding to the RB in the following manner delivering the SDU in the reordered erroneous data packet to the RLC entity module 1030 corresponding to the RB.

The UE in the embodiment may perform the method in the above-mentioned embodiment, and may specifically refer to the above-mentioned embodiment. The effect capable of being acquired by the UE is the same as the above-mentioned method, and will not be repeated redundantly herein.

Figure 11:
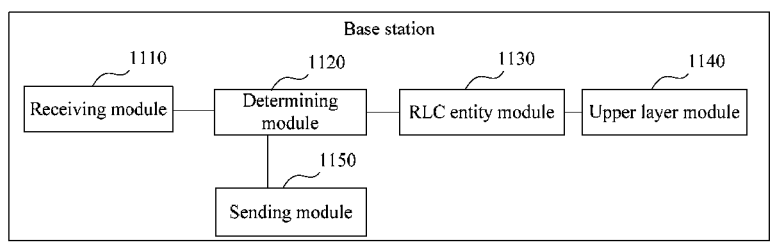
FIG. 11 is a schematic diagram of a base station of an embodiment of the present invention.

Another embodiment of the present invention provides a base station, and the base station may perform the method for transmitting data in any above-mentioned embodiment. The embodiment only simply describes the structure of the base station, and the specific implementation manner may refer to descriptions in the above-mentioned embodiment. As shown in FIG. 11, the base station includes:

a receiving module 1110, configured to receive a data packet sent by UE through an RB;

a determining module 1120, configured to determine that service data unit SDU delivery needs to be performed for an erroneous data packet born on the radio bearer RB of a service; if the received data packet is not received correctly after maximum retransmission times are achieved, determine that the data packet received by the receiving module 1110 is the erroneous data packet, and deliver the SDU in the erroneous data packet to a radio link control RLC entity module 1130 corresponding to the RB;

the RLC entity module 1130, configured to deliver the SDU delivered by the determining module to an upper layer module 1140 of the RLC entity module 1130; and the upper layer module 1140, configured to acquire the SDU delivered by the RLC entity module 1130.

The determining module 1120 is specifically configured to determine that the SDU delivery needs to be performed for the erroneous data packet born on the RB of the service in the following manner determining that the SDU delivery needs to be performed for the erroneous data packet born on the RB of the service according to subscription information of the user equipment.

Further, the base station may further include a sending module 1150;

the sending module 1150 is configured to, after the determining module 1120 determines that the SDU delivery needs to be performed for the erroneous data packet born on the RB of the service, send configuration information of the service to the UE, for enabling the UE to determine that the SDU delivery needs to be performed for the erroneous data packet born on the RB according to the configuration information, wherein the configuration information includes indication information that the SDU delivery needs to be performed for the erroneous data packet born on the RB and the information of the RB.

Further, the sending module 1150 is specifically configured to send the configuration information of the service to the UE in the following manner sending the configuration information of the service to the UE through an RRC message or MAC layer signaling or physical layer signaling.

Further, the sending module 1150 is specifically configured to send a dedicated-radio network temporary identifier D-RNTI to the UE, wherein the D-RNTI is the indication information.

Further, the sending module 1150 is specifically configured to send a position of an indication bit in a scheduling command to the UE, wherein the position of the indication bit in the scheduling command is the indication information.

The sending module 1150 is further configured to send the scheduling command to the UE, wherein the scheduling command includes the indication bit, for enabling the UE to determine the indication bit in the scheduling command according to the indication information, and determine that the SDU delivery needs to be performed for the erroneous data packet born on the RB according to the indication bit in the scheduling command Further, the determining module 1120 is further configured to determine the size of each SDU in the erroneous data packet according to data to be sent by the UE, before delivering the SDU in the erroneous data packet to the RLC entity module corresponding to the RB;

the determining module 1120 is specifically configured to deliver the SDU in the erroneous data packet to the RLC entity module 1130 corresponding to the RB in the following manner determining each SDU according to the size of each SDU in the erroneous data packet, recombining the SDU into an RLC SDU, and delivering the RLC SDU to the RLC entity module 1130, wherein each SDU bears the data to be sent by the UE;

the RLC entity module 1130 is specifically configured to deliver the SDU to the upper layer module of the RLC entity module in the following manner delivering the RLC SDU to the upper layer module of the RLC entity module 1130.

Further, the determining module 1120 is further configured to determine a padding size according to the size of the data to be sent by the UE, before delivering the SDU in the erroneous data packet to the RLC entity module 1130 corresponding to the RB, wherein the SDU bears the data to be sent by the UE;

the determining module 1120 is specifically configured to deliver the SDU in the erroneous data packet to the RLC entity module 1130 corresponding to the RB in the following manner according to the padding size, removing padding corresponding to the padding size in the erroneous data packet to acquire the SDU in the erroneous data packet, and delivering the SDU in the erroneous data packet to the RLC entity module 1130 corresponding to the RB.

Further, the determining module 1120 is further configured to, before delivering the SDU in the erroneous data packet to the RLC entity module 1130 corresponding to the RB, reorder the erroneous data packet by means of one or any combination of the following manners:

judging a progress, to which the erroneous data packet belongs, by using a new data packet indication NDI domain in a scheduling command transmitted on a physical downlink control channel PDCCH, and reordering the erroneous data packet according to the progress;

determining the first transmission moment of the erroneous data packet by using a redundancy version RV domain in the scheduling command transmitted on the PDCCH, and reordering according to the first transmission moment; and determining the first transmission moment of the erroneous data packet according to a preset semi-persistent scheduling period, and reordering according to the first transmission moment;

the determining module 1120 is specifically configured to deliver the SDU in the erroneous data packet to the RLC entity module 1130 corresponding to the RB in the following manner delivering the SDU in the reordered erroneous data packet to the RLC entity module 1130 corresponding to the RB.

The base station in the embodiment may perform the method in the above-mentioned embodiment, and may specifically refer to the above-mentioned embodiment. The effect capable of being acquired by the base station is the same as the above-mentioned method, and will not be repeated redundantly herein.

In addition, the embodiment further provides a system for transmitting data, and the system includes the UE and the base station in the above-mentioned embodiment. Specific reference may be made to descriptions in the above-mentioned embodiment, and will not be repeated redundantly herein.

Figure 12:
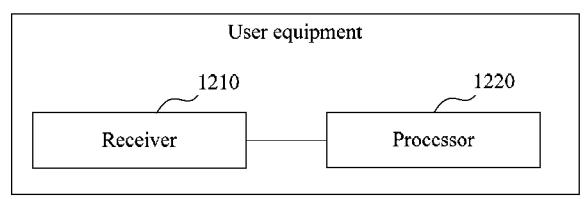
FIG. 12 is a schematic diagram of a user equipment of another embodiment of the present invention.

Another embodiment of the present invention provides a UE, and the UE may perform the method for transmitting data in any above-mentioned embodiment. The embodiment only simply describes the structure of the UE, and the specific implementation manner may refer to descriptions in the above-mentioned embodiment. As shown in FIG. 12, the UE includes:

a receiver 1210, configured to receive a data packet sent by a base station through an RB;

a processor 1220, configured to determine that service data unit SDU delivery needs to be performed for an erroneous data packet born on the RB of a service; if determining that the data packet received by the receiver is not received correctly after maximum retransmission times are achieved, determine that the data packet received by the receiver is the erroneous data packet, acquire the SDU in the erroneous data packet, adopt the SDU in the erroneous data packet to constitute an RLC SDU of a radio link control RLC layer corresponding to the RB, and adopt the RLC SDU to form a data frame.

The receiver 1210 is further configured to receive configuration information of the service from the base station, wherein the configuration information includes indication information that the SDU delivery needs to be performed and information of the RB;
the processor 1220 is specifically configured to determine that the service data unit SDU delivery needs to be performed for the erroneous data packet born on the radio bearer RB of the service in the following manner determining that the SDU delivery needs to be performed for the erroneous data packet born on the RB according to the indication information.

Optionally, the receiver 1210 is specifically configured to receive a dedicated-radio network temporary identifier D-RNTI, wherein the D-RNTI is the indication information;
the processor 1220 is specifically configured to determine that the SDU delivery needs to be performed for the erroneous data packet born on the RB according to the indication information in the following manner determining that the SDU delivery needs to be performed for the erroneous data packet born on the RB according to the D-RNTI, wherein the D-RNTI is configured by the base station for the UE.

Optionally, the receiver 1210 is specifically configured to receive a scheduling command sent by the base station, wherein the scheduling command includes an indication bit;
the receiver 1210 is specifically configured to receive the position of the indication bit in the scheduling command, wherein the position of the indication bit in the scheduling command is the indication information;
the processor 1220 is specifically configured to determine that the SDU delivery needs to be performed for the erroneous data packet born on the RB according to the indication information in the following manner determining the indication bit in the scheduling command according to the indication information, and determining that the SDU delivery needs to be performed for the erroneous data packet born on the RB according to the indication bit in the scheduling command received by the receiver, wherein the indication information is the position of the indication bit in the scheduling command Further, the receiver 1210 is specifically configured to receive the configuration information of the service from the base station in the following manner the UE receives the configuration information of the service from the base station through a radio resource control RRC message or media access control MAC layer signaling or physical layer signaling.

Further, the receiver 1210 is further configured to receive SDU size information sent by the base station, and the SDU size information is used for indicating the size of each SDU in the erroneous data packet;
the processor 1220 is further configured to, before acquiring the SDU in the erroneous data packet, determine each SDU in the erroneous data packet according to the SDU size information received by the receiver 1210.

Further, the receiver 1210 is further configured to receive a padding indication sent by the base station by the UE, wherein the padding indication is used for indicating the padding size of the data packet;
the processor 1220 is further configured to determine the padding size in the erroneous data packet before acquiring the SDU in the erroneous data packet;
The processor 1220 is specifically configured to acquire the SDU in the erroneous data packet in the following manner according to the padding size, removing padding corresponding to the padding size in the erroneous data packet to acquire the SDU in the erroneous data packet.

Further, the processor 1220 is further configured to, before delivering the SDU in the erroneous data packet to the RLC entity corresponding to the RB, reorder the erroneous data packet by means of one or any combination of the following manners:
judging a progress, to which the erroneous data packet belongs, by using a new data packet indication NDI domain in a scheduling command transmitted on a physical downlink control channel PDCCH, and reordering the erroneous data packet according to the progress;
determining the first transmission moment of the erroneous data packet by using a redundancy version RV domain in the scheduling command transmitted on the PDCCH, and reordering according to the first transmission moment; and
determining the first transmission moment of the erroneous data packet according to a preset semi-persistent scheduling period, and reordering according to the first transmission moment.

The UE in the embodiment may perform the method in the above-mentioned embodiment, and may specifically refer to the above-mentioned embodiment. The effect capable of being acquired by the UE is the same as the above-mentioned method, and will not be repeated redundantly herein.

Figure 13:
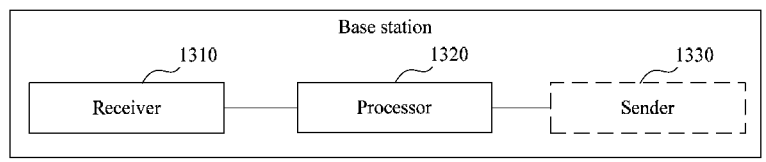
FIG. 13 is a schematic diagram of a base station of another embodiment of the present invention.

Another embodiment of the present invention provides a base station, and the base station may perform the method for transmitting data in any above-mentioned embodiment. The embodiment only simply describes the structure of the base station, and the specific implementation manner may refer to descriptions in the above-mentioned embodiment. As shown in FIG. 13, the base station includes:
a receiver 1310, configured to receive a data packet sent by a user equipment UE through an RB; and
a processor 1320, configured to determine that service data unit SDU delivery needs to be performed for an erroneous data packet born on the RB of a service; if the received data packet is not received correctly after maximum retransmission times are achieved, determine that the data packet received by the receiver 1310 is the erroneous data packet, acquire the SDU in the erroneous data packet, adopt the SDU in the erroneous data packet to constitute an RLC SDU of a radio link control RLC layer corresponding to the RB, and adopt the RLC SDU to form a data frame.

The processor 1320 is specifically configured to determine that the SDU delivery needs to be performed for the erroneous data packet born on the RB of the service in the following manner determining that the SDU delivery needs to be performed for the erroneous data packet born on the RB of the service according to subscription information of the user equipment.

In addition, the base station may further include a sender 1330;
the sender 1330 is configured to, after the processor 1320 determines that the SDU delivery needs to be performed for the erroneous data packet born on the RB of the service, send configuration information of the service to the UE, for enabling the UE to determine that the SDU delivery needs to be performed for the erroneous data packet born on the RB according to the configuration information, wherein the configuration information includes indication information that the SDU delivery needs to be performed for the erroneous data packet born on the RB and information of the RB.

The sender 1330 is specifically configured to send a dedicated-radio network temporary identifier D-RNTI to the UE, wherein the D-RNTI is the indication information.

The sender 1330 is specifically configured to send a position of an indication bit in a scheduling command to the UE, wherein the position of the indication bit in the scheduling command is the indication information;

the sender 1330 is further configured to send the scheduling command to the UE, wherein the scheduling command includes the indication bit, for enabling the UE to determine the indication bit in the scheduling command according to the indication information, and to determine that the SDU delivery needs to be performed for the erroneous data packet born on the RB according to the indication bit in the scheduling command Further, the sender 1320 is specifically configured to send the configuration information of the service to the UE in the following manner sending the configuration information of the service to the UE through a radio resource control RRC message or media access control MAC layer signaling or physical layer signaling.

Further, the processor 1320 is further configured to, before delivering the SDU in the erroneous data packet to the RLC entity corresponding to the RB, according to the data to be sent by the UE, the base station determines the size of each SDU in the erroneous data packet;

the processor 1320 is specifically configured to acquire the SDU in the erroneous data packet in the following manner determining each SDU according to the size of each SDU in the erroneous data packet, and acquiring the SDU in the erroneous data packet.

Further, the sender 1310 is further configured to send the size of each SDU determined by the processor 1320 to the UE.

Further, the processor 1320 is further configured to, before delivering the SDU in the erroneous data packet to the RLC entity corresponding to the RB, determine a padding size according to the size of the data to be sent by the UE, wherein the SDU bears the data to be sent by the UE;

the sending module 1310 is further configured to send the padding size determined by the determining module to the UE;

the processor 1320 is specifically configured to acquire the SDU in the erroneous data packet in the following manner according to the padding size, removing padding corresponding to the padding size in the erroneous data packet to acquire the SDU in the erroneous data packet.

Further, the processor 1320 is further configured to, before delivering the SDU in the erroneous data packet to the RLC entity corresponding to the RB, reorder the erroneous data packet by means of one or any combination of the following manners:

judging a progress, to which the erroneous data packet belongs, by using a new data packet indication NDI domain in a scheduling command transmitted on a physical downlink control channel PDCCH, and reordering the erroneous data packet according to the progress;

determining the first transmission moment of the erroneous data packet by using a redundancy version RV domain in the scheduling command transmitted on the PDCCH, and reordering according to the first transmission moment; and determining the first transmission moment of the erroneous data packet according to a preset semi-persistent scheduling period, and reordering according to the first transmission moment.

The base station in the embodiment may perform the method in the above-mentioned embodiment, and may specifically refer to the above-mentioned embodiment. The effect capable of being acquired by the base station is the same as the above-mentioned method, and will not be repeated redundantly herein.

In addition, the embodiment further provides a system for transmitting data, and the system includes the UE and the base station in the above-mentioned embodiment. Specific reference may be made to descriptions in the above-mentioned embodiment, and will not be repeated redundantly herein.

It should be noted that, the embodiments of the present invention may be applied to a variety of wireless communication systems, the base station herein is a general term of entities with base station functions in each system, for example, in an LTE system, the base station may be an evolved node B (eNB), while the embodiments of the present invention are not limited to the LTE system, and other radio communication systems are also applicable, for example, a universal mobile telecommunications system (UMTS) or the like. Moreover, the base station may configure the D-RNTI for the UE at any moment. It is only taken as an example for illustration that the base station configures the D-RNTI for the UE when establishing the service, but the method of the embodiments of the present invention is not limited hereto.

Those of ordinary skills in the art may understand that all or a part of the steps in various methods in the above-mentioned embodiments may be finished with a program instructing corresponding hardware, the foregoing program may be stored in a computer readable storage medium, and the storage medium may be a read-only memory (ROM), a random access memory (RAM), a magnetic disk, an optical disk or the like.

The method, the user equipment and the base station provided by the embodiments of the present invention have been described above in detail. In this paper, the principles and the implementation manners of the present invention are illustrated by specific examples, and the illustration in the above-mentioned embodiments is only used for helping to understand the method and the core concept of the present invention; meanwhile, those of ordinary skills in the art will make variations on the specific implementation manners and the application range according to the concept of the present invention. To sum up, the contents in the description should not be interpreted as limit to the present invention.

What is claimed is:

1. A method for transmitting a data packet, comprising:

determining, by a user equipment (UE), that delivery of a service data unit (SDU) needs to be performed for an erroneous data packet born on a radio bearer (RB) of a service;

determining, by the UE, that a received data packet is the erroneous data packet, if the received data packet is not received correctly after maximum retransmission times are achieved; and delivering, by the UE, the SDU in the erroneous data packet to a radio link control (RLC) entity corresponding to the RB, and sending, by the RLC entity in the UE, the SDU to an upper layer of the RLC entity.

2. The method of claim 1, wherein,
before the determining, by a UE, that delivery of the SDU needs to be performed for an erroneous data packet born on an RB, the method further comprises: receiving, by the UE, configuration information of the service from a base station, wherein the configuration information comprises indication information that the SDU delivery needs to be performed and information of the RB;
the determining, by a UE, that delivery of the SDU to be performed for an erroneous data packet born on an RB, comprises: determining, by the UE, according to the indication information, that the delivery of the SDU to be performed for the erroneous data packet born on the RB.

3. The method of claim 2, wherein the indication information is a position of an indication bit in a scheduling command;
before the determining, by the UE, according to the indication information, that the delivery of the SDU to be performed for the erroneous data packet born on the RB, the method further comprises: receiving, by the UE, the scheduling command sent by the base station, wherein the scheduling command comprises the indication bit;
the determining, by the UE, according to the indication information, that the delivery of the SDU needs to be performed for the erroneous data packet born on the RB, comprises: determining, by the UE, according to the indication information, the indication bit in the scheduling command, and determining, according to the indication bit in the scheduling command, that the delivery of the SDU needs to be performed for the erroneous data packet born on the RB.

4. The method of claim 1, wherein before the delivering the SDU in the erroneous data packet to the RLC entity corresponding to the RB, the method further comprises:
receiving, by the UE, SDU size information sent by a base station, wherein the SDU size information indicates a size of each SDU in the erroneous data packet; and
determining, by the UE, according to the received SDU size information, each SDU in the erroneous data packet;
the delivering the SDU in the erroneous data packet to the RLC entity corresponding to the RB, comprises: recombining the SDU into an RLC SDU, and delivering the RLC SDU to the RLC entity; and
the delivering, by the RLC entity, the SDU to the upper layer of the RLC entity, comprises: delivering, by the RLC entity, the RLC SDU to the upper layer of the RLC entity.

5. The method of claim 1, wherein before the delivering the SDU in the erroneous data packet to the RLC entity corresponding to the RB, the method further comprises:
reordering the erroneous data packet using one or a combination of the following manners:
judging a progress, to which the erroneous data packet belongs, using a new data packet indication (NDI) domain in a scheduling command transmitted on a physical downlink control channel (PDCCH), and reordering the erroneous data packet according to the progress;
determining the first transmission moment of the erroneous data packet using a redundancy version (RV) domain in the scheduling command transmitted on the PDCCH, and reordering the erroneous data packet according to the first transmission moment; and determining, according to a preset semi-persistent scheduling period, the first transmission moment of the erroneous data packet, and reordering the erroneous data packet according to the first transmission moment;
the delivering the SDU in the erroneous data packet to the RLC entity corresponding to the RB, comprises: delivering the SDU in the reordered erroneous data packet to the RLC entity corresponding to the RB.

6. A method for transmitting a data packet, comprising:
determining, by a base station, that delivery of a service data unit (SDU) needs to be performed for an erroneous data packet born on a radio bearer (RB) of a service;
determining, by the base station, that a received data packet is the erroneous data packet, if the data packet sent by a user equipment (UE) is not received correctly after maximum retransmission times are achieved; and
delivering, by the base station, the SDU in the erroneous data packet to a radio link control (RLC) entity corresponding to the RB, and sending, by the RLC entity in the base station, the SDU to an upper layer of the RLC entity.

7. The method of claim 6, wherein after the determining, by a base station, that of the SDU needs to be performed for an erroneous data packet born on an RB of a service, the method further comprises:
sending, by the base station, configuration information of the service to the UE, to enable the UE, according to the configuration information, to determine that the delivery of the SDU needs to be performed for the erroneous data packet born on the RB, wherein the configuration information comprises indication information that the delivery of the SDU needs to be performed for the erroneous data packet born on the RB and information of the RB.

8. The method of claim 7, wherein,
the indication information is a position of an indication bit in a scheduling command;
after the determining, by a base station, delivery of the SDU needs to be performed for an erroneous data packet born on an RB of a service, the method further comprises:
sending, by the base station, the scheduling command to the UE, wherein the scheduling command comprises the indication bit, to enable the UE, according to the indication information, to determine the indication bit in the scheduling command, and according to the indication bit in the scheduling command, to determine that the delivery of the SDU needs to be performed for the erroneous data packet born on the RB.

9. The method of claim 6, wherein,
the delivering, by the base station, the SDU in the erroneous data packet to an RLC entity corresponding to the RB, and sending, by the RLC entity in the base station, the SDU to an upper layer of the RLC entity, comprises:
delivering the SDU in the erroneous data packet to the RLC entity corresponding to the RB, and indicating to the RLC entity that the SDU delivered at this time is not received correctly; sending, by the RLC entity, the SDU to the upper layer of the RLC entity, and indicating to the upper layer that the SDU delivered at this time is not received correctly.

10. The method of claim 6, further comprising:
determining, by the base station, according to data to be sent by the UE, a size of each SDU in the erroneous data packet;

sending, by the base station, the size of the each SDU to the UE.

11. A user equipment (UE), comprising:
a receiver, configured to receive a data packet sent by a base station through a radio bearer (RB);
a processor, configured to determine that delivery of a service data unit (SDU) needs to be performed for an erroneous data packet born on the RB of a service; if determining that the data packet received by the receiver is not received correctly after maximum retransmission times are achieved, determine that the data packet received by the receiver is the erroneous data packet, acquire the SDU in the erroneous data packet, adopt the SDU in the erroneous data packet to constitute an RLC SDU of a radio link control (RLC) layer corresponding to the RB, and adopt the RLC SDU to form a data frame.

12. The user equipment of claim 11, wherein,
the receiver is further configured to receive configuration information of the service from the base station, wherein the configuration information comprises indication information that the delivery of the SDU needs to be performed and information of the RB;
the processor is configured to determine that the delivery of the SDU needs to be performed for the erroneous data packet born on the radio bearer RB of the service according to the indication information.

13. The user equipment of claim 12, wherein,
the receiver is configured to receive a position of an indication bit in a scheduling command, wherein the position of the indication bit in the scheduling command is the indication information;
the receiver is further configured to receive the scheduling command sent by the base station, wherein the scheduling command comprises the indication bit;
the processor is configured to determine that the delivery of the SDU needs to be performed for the erroneous data packet born on the RB according to the indication information in the following manner according to the indication information, determine the indication bit in the scheduling command, and according to the indication bit in the scheduling command received by the receiver, determine that the delivery of the SDU needs to be performed for the erroneous data packet born on the RB, wherein the indication information is the position of the indication bit in the scheduling command.

14. The user equipment of claim 11, wherein,
the receiver is further configured to receive SDU size information sent by the base station, and the SDU size information indicates a size of each SDU in the erroneous data packet;
the processor is further configured to, before acquiring the SDU in the erroneous data packet, according to the SDU size information received by the receiver, determine each SDU in the erroneous data packet.

15. The user equipment of claim 11, wherein the processor is further configured to, before delivering the SDU in the erroneous data packet to the RLC entity corresponding to the RB, reorder the erroneous data packet using one or a combination of the following manners:
judging a progress, to which the erroneous data packet belongs, using a new data packet indication (NDI) domain in a scheduling command transmitted on a physical downlink control channel (PDCCH), and reordering the erroneous data packet according to the progress;

determining the first transmission moment of the erroneous data packet using a redundancy version (RV) domain in the scheduling command transmitted on the PDCCH, and reordering the erroneous data packet according to the first transmission moment; and
determining, according to a preset semi-persistent scheduling period, the first transmission moment of the erroneous data packet, and reordering the erroneous data packet according to the first transmission moment.

16. A base station, comprising:
a receiver, configured to receive a data packet sent by a user equipment (UE) through a radio bearer (RB);
a processor, configured to determine that delivery of a service data unit (SDU) needs to be performed for an erroneous data packet born on the RB of a service; if the received data packet is not received correctly after maximum retransmission times are achieved, determine that the data packet received by the receiver is the erroneous data packet, acquire the SDU in the erroneous data packet, adopt the SDU in the erroneous data packet to constitute an RLC SDU of a radio link control (RLC) layer corresponding to the RB, and adopt the RLC SDU to form a data frame.

17. The base station of claim 16, further comprising a sender;
the sender is configured to, after the processor determines that the delivery of the SDU needs to be performed for the erroneous data packet born on the RB of the service, send configuration information of the service to the UE, to enable the UE, according to the configuration information, to determine that the delivery of the SDU needs to be performed for the erroneous data packet born on the RB, wherein the configuration information comprises indication information that the delivery of the SDU to be performed for the erroneous data packet born on the RB and information of the RB.

18. The base station of claim 17, wherein,
the indication information is a position of an indication bit in a scheduling command;
the sender is further configured to send the scheduling command to the UE, wherein the scheduling command comprises the indication bit, to enable the UE, according to the indication information, to determine the indication bit in the scheduling command, and according to the indication bit in the scheduling command, to determine that the delivery of the SDU needs to be performed for the erroneous data packet born on the RB.

19. The base station of claim 16, wherein,
the processor is configured to deliver the SDU in the erroneous data packet to the RLC entity corresponding to the RB, and to indicate to the RLC entity that the SDU delivered at this time is not received correctly; to enable the RLC entity to send the SDU to the upper layer of the RLC entity, and to indicate to the upper layer that the SDU delivered at this time is not received correctly.

20. The base station of claim 16, wherein,
the processor is further configured to determine a size of each SDU in the erroneous data packet according to data to be sent by the UE;
the sender is further configured to send a size of each SDU to the UE.

* * * * *

UNITED STATES PATENT AND TRADEMARK OFFICE
CERTIFICATE OF CORRECTION

PATENT NO. : 9,467,892 B2
APPLICATION NO. : 14/615370
DATED : October 11, 2016
INVENTOR(S) : Quan et al.

Page 1 of 1

It is certified that error appears in the above-identified patent and that said Letters Patent is hereby corrected as shown below:

In the Claims

Column 26, Line 24, Claim 7, "that of the SDU" should read -- that delivery of the SDU --.

Signed and Sealed this
Eighteenth Day of April, 2017

Michelle K. Lee
*Director of the United States Patent and Trademark Office*